United States Patent
Doshi et al.

(10) Patent No.: US 6,321,330 B1
(45) Date of Patent: Nov. 20, 2001

(54) EACH ITERATION ARRAY SELECTIVE LOOP DATA PREFETCH IN MULTIPLE DATA WIDTH PREFETCH SYSTEM USING ROTATING REGISTER AND PARAMETERIZATION TO AVOID REDUNDANT PREFETCH

(75) Inventors: Gautam B. Doshi, Sunnyvale; Kalyan Muthukumar, Cupertino, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/322,196

(22) Filed: May 28, 1999

(51) Int. Cl.[7] ..................................................... G06F 9/34
(52) U.S. Cl. ..................... 712/241; 711/213; 712/225; 717/9
(58) Field of Search ............................... 717/9; 711/213; 712/225, 241

(56) References Cited

U.S. PATENT DOCUMENTS

| | | | |
|---|---|---|---|
| 5,357,618 | * 10/1994 | Mirza et al. | 711/3 |
| 5,704,053 | * 12/1997 | Santhanam | 712/207 |
| 5,752,037 | * 5/1998 | Gornish et al. | 717/9 |
| 5,754,876 | * 5/1998 | Tamaki et al. | 712/4 |
| 5,854,934 | * 12/1998 | Hsu et al. | 717/9 |
| 5,881,263 | 3/1999 | York et al. . | |
| 5,889,985 | * 3/1999 | Babaian et al. | 712/225 |
| 6,148,439 | * 11/2000 | Nishiyama | 717/9 |

FOREIGN PATENT DOCUMENTS

WO 98/06041  2/1998  (WO) .

* cited by examiner

Primary Examiner—Kenneth S. Kim
(74) Attorney, Agent, or Firm—Leo V. Novakoski

(57) ABSTRACT

The present invention provides a mechanism for prefetching array data efficiently from within a loop. A prefetch instruction is parameterized by a register from a set of rotating registers. On each loop iteration, a prefetch is implemented according to the parameterized prefetch instruction, and the address targeted by the prefetch instruction is adjusted. The registers are rotated for each loop iteration, and the prefetch instruction parameterized by the rotating register is adjusted accordingly. The number of iterations between prefetches for a given array is determined by the number of elements in the set of rotating register.

35 Claims, 3 Drawing Sheets

```
Unr_Loop:
        prefetch A(J+X)
        load A(J)
        load B(J)
        load C(J)
        load D(J)
        load E(J)
    . . .
        prefetch B(J+X)
        load A(J+1)
        load B(J+1)
        load C(J+1)
        load D(J+1)
        load E(J+1)
    . . .
        prefetch C(J+X)
        load A(J+2)
        load B(J+2)
        load C(J+2)
        load D(J+2)
        load E(J+2)
    . . .
        prefetch D(J+X)
        load A(J+3)
        load B(J+3)
        load C(J+3)
        load D(J+3)
        load E(J+3)
    . . .
        prefetch E(J+X)
        load A(J+4)
        load B(J+4)
        load C(J+4)
        load D(J+4)
        load E(J+4)
    . . .
        load A(J+5)
        load B(J+5)
        load C(J+5)
        load D(J+5)
        load E(J+5)
    . . .
        load A(J+6)
        load B(J+6)
        load C(J+6)
        load D(J+6)
        load E(J+6)
    . . .
        load A(J+7)
        load B(J+7)
        load C(J+7)
        load D(J+7)
        load E(J+7)
    . . .
        J=J+8
        branch          Unr_loop
```

FIG. 1

EACH ITERATION ARRAY SELECTIVE LOOP DATA PREFETCH IN MULTIPLE DATA WIDTH PREFETCH SYSTEM USING ROTATING REGISTER AND PARAMETERIZATION TO AVOID REDUNDANT PREFETCH

BACKGROUND OF THE INVENTION

1. Technical Field

The present invention relates to methods for prefetching data, and in particular, to methods for performing prefetches within a loop.

2. Background Art

Currently available processors run at clock speeds that are significantly faster than the clock speeds at which their associated memories operate. It is the function of the memory system to mask this discrepancy between memory and processor speeds, and to keep the processor's execution resources supplied with data. For this reason, memory systems typically include a hierarchy of caches, e.g. L0, L1, L2 . . . , in addition to a main memory. The caches are maintained with data that the processor is likely to request by taking advantage of the spatial and temporal locality exhibited by most program code. For example, data is loaded into the cache in blocks called "cache lines" since programs tend to access data in adjacent memory locations (spatial locality). Similarly, data that has not been used recently is preferentially evicted from the cache, since data is more likely to be accessed when it has recently been accessed (temporal locality).

The advantages of storing data in caches arise from their relatively small sizes and their attendant greater access speeds. They are fast memory structures that can provide data to the processor quickly. The storage capacities of caches generally increase from L0 to L2, et seq., as does the time required by succeeding caches in the hierarchy to return data to the processor. A data request propagates through the cache hierarchy, beginning with the smallest, fastest structure, until the data is located or the caches are exhausted. In the latter case, the requested data is returned from main memory.

Despite advances in the design of memory systems, certain types of programming structures can still place significant strains on their ability to provide the processor with data. For example, code segments that access large amounts of data from loops can rapidly generate mulitple cache misses. Each cache miss requires a long latency access to retrieve the target data from a higher level cache or main memory. These accesses can significantly reduce the computer system's performance.

Prefetching is a well known technique for masking the latency associated with moving data from main memory to the lower level caches (those closest to the processor's execution resources). A prefetch instruction is issued well ahead of the time the targeted data is required. This overlaps the access with other operations, hiding the access latency behind these operations. However, prefetch instructions bring with them their own potential performance costs. Prefetch requests add traffic to the processor memory channel, which may increase the latency of loads. These problems are exacerbated for loops that load data from multiple arrays on successive loop iterations. Such loops can issue periodic prefetch requests to ensure that the array data is available in the low level caches when the corresponding loads are executed. As discussed below, simply issuing requests on each loop iteration generates unnecessary, i.e. redundant, memory traffic and bunches the prefetches in relatively short intervals.

A prefetch returns a line of data that includes the requested address to one or more caches. Each cache line typically includes sufficient data to provide array elements for multiple loop iterations. As a result, pefetches do not need to issue on every iteration of the loop. Further, generating too many prefetch requests in a short interval can degrade system performance. Each prefetch request consumes bandwidth in the processor-memory communication channel, increasing the latency for demand fetches and other operations that use this channel. In addition, where multiple arrays are manipulated inside a loop, prefetch operations are provided for each array. Cache misses for these prefetches tend to occur at the same time, further burdening the memory subsystem with bursts of activity. One method for dealing with some of these issues is loop unrolling.

A portion of an exemplary loop (I) is shown below. The loop loads and manipulates data from five arrays A, B, C, D, and E on each loop iteration.

(I)
   Orig_Loop:
      load A(I)
      load B(I)
      load C(I)
      load D(I)
      load E(I)
      . . .
      branch Orig_Loop FIG. 1 represents loop (I) following its modification to incorporate prefetching. Here, it is assumed that each array element is 8 bytes and each cache line returns 64 bytes, in which case a prefetch need only be issued for an array on every eighth iteration of the loop. This is accomplished in FIG. 1 by unrolling loop (I) 8 times, and issuing a prefetch request for each array with the instruction groups for successive array elements. Unrolling the loop in this manner adjusts the amount of data that is consumed on each iteration of the loop to equal the amount of data that is provided by each prefetch, eliminating redundant prefetches. On the other hand, loop unrolling can significantly expand a program's footprint (size) in memory, and it fails to address the bursts of prefetch activity that can overwhelm the memory channel.

An alternative approach to eliminating redundant prefetches is to predicate the prefetches, calculate the predicate values on successive iterations to gate the appropriate prefetch(es) on or off. The instruction necessary to implement the predicate calculations expand the code size and, depending on the conditions to be determined, can slow down the loop.

The present invention addresses these and other issues related to implementing prefetches from loops.

SUMMARY OF THE INVENTION

The present invention reduces the instruction overhead and improves scheduling for software data prefetches. Register rotation is used to distribute prefetches over selected loop iterations, reducing the number of prefetches issued in any given iteration. It is particularly useful for programs that access large amounts of data from within loops.

In accordance with the present invention, data is prefetched within a loop by a prefetch operation that is parameterized by a value in a register. Data targeted by the prefetch operation is adjusted by rotating a new value into the register.

For one embodiment of the invention, the register that parameterizes the prefetch operation is a rotating register that indicates the address to be prefetched. Rotating a new value into the register alters the prefetch target for a subsequent iteration of the loop. For another embodiment of the invention, the register is a rotating predicate register that activates or deactivates the prefetch operation according to the current value of the predicate it stores. Rotating a new value into the register activates or deactivates the prefetch operation for the next iteration of the loop.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

FIG. 1 represents a loop that has been unrolled according to conventional methods to implement prefetching from within the loop.

DETAILED DESCRIPTION OF THE INVENTION

Figure 2:
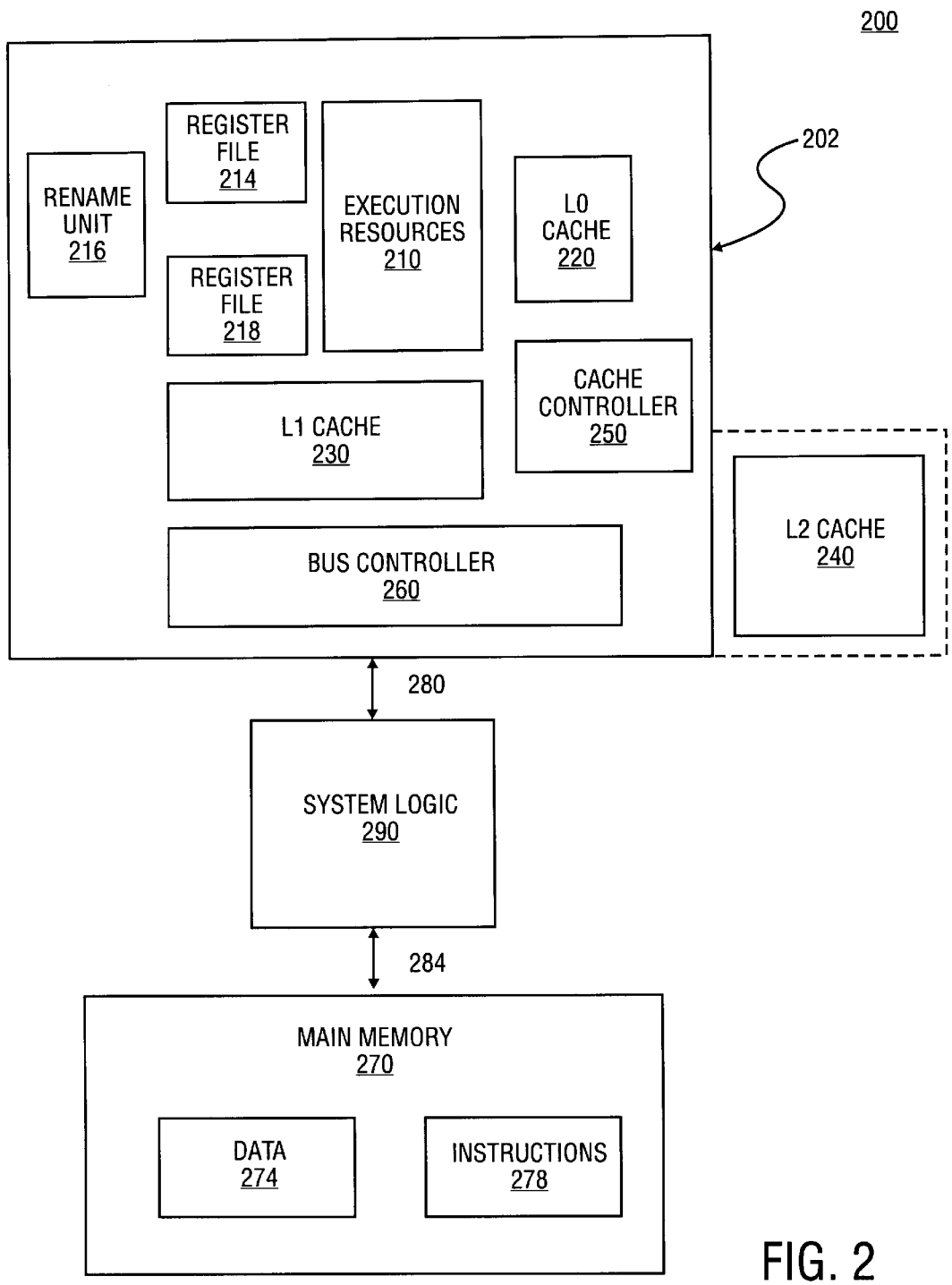
FIG. 2 is a block diagram of one embodiment of a system in which the present invention may be implemented.

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention supports efficient prefetching by reducing the instruction overhead and improving the scheduling of software data prefetches. It is particularly useful where data prefetching is implemented during loop operations. Methods in accordance with the present invention allow prefetches to be issued within loops at intervals determined by the cache line size and the data size being requested rather than by the loop iteration interval. They do so without expanding the code size or adding costly calculations (instruction overhead) within the loop. Rather, a prefetch operation within the loop is parameterized by a value stored in a selected register from a set of rotating registers. Pefetching is adjusted by rotating a new value into the selected register on each iteration of the loop.

For one embodiment, the register value indicates an address to be targeted by the prefetch operation. Where the loop includes loads to multiple arrays, a prefetch instruction is targeted to prefetch data for a different array on each iteration of the loop. The size of the rotating register set is determined by the number of arrays in the loop for which data is to be prefetched. Depending on the number of arrays to be prefetched, the size of their data elements (stride) and the cache line size, it may be preferable to employ more than one prefetch instruction per loop iteration. In addition to controlling the frequency of prefetches for each array, reuse of the prefetch instruction for multiple arrays reduces the footprint of the program code in memory.

For an alternative embodiment, the register is a predicate register and a prefetch instruction is gated on or off according to the value it holds. If the loop includes a single array from which data is loaded, the prefetch instruction can be activated for selected loop iterations by initializing the rotating predicate registers appropriately. This eliminates redundant prefetch requests that may be generated when the cache line returns sufficient data for multiple loop iterations. If the loop includes multiple arrays, multiple prefetch instructions may be parameterized by associated predicate registers. Register rotation determines which prefetch instruction(s) is activated for which array on each loop iteration.

Persons skilled in the art and having the benefit of this disclosure will recognize that the exemplary embodiments may be modified and combined to accommodate the resources available in a particular computer system and the nature of the program code.

The present invention may be implemented in a system that provides support for register rotation. For the purpose of this discussion, register rotation refers to a method for implementing register renaming. In register rotation, the values stored in a specified set of registers are shifted cyclically among the registers. Rotation is typically done under control of an instruction, such as a loop branch instruction. For example, a value stored in register, r(n), on a current iteration of a loop, is shifted to register r(n+1) when the loop branch instruction triggers the next iteration of the loop. Register rotation is described, for example, in IA-64 Application Instruction Set Architecture Guide, published by Intel® Corporation of Santa Clara, Calif. A more detailed description may be found in Rau, B. R., Lee, M., Tirumalai, P., and Schlansker, M. S. *Register Allocation For Software Pipelined Loops,* Proceedings of the SIGNPLAN '92 Conference on Programming Language Design and Implementation, (San Francisco, 1992).

The number and type of registers available for rotation may vary with the register type. For example, Intel's IA-64 instruction set architecture (ISA) provides 64 rotating predicate registers, ninety-six rotating floating point registers, and a variable number of rotating general purpose registers. In the IA-64 ISA, up to ninety-six of the 128 general purpose registers may be defined to rotate. Rotating general purpose registers are defined in multiples of 8.

FIG. 2 is a block diagram of one embodiment of a system 200 in which the present invention may be implemented. System 200 includes a processor 202 and a main memory 270 hat are coupled to system logic 290 through a system bus 280 and a memory bus 284. System 200 typically also includes a graphics system and peripheral device(s) (not shown) which also communicate through system logic 290.

The disclosed embodiment of processor 202 includes execution resources 210, a first cache (L0) 220, a second cache (L1) 230, a third cache (L2) 240, a cache controller 250, and a bus controller 260. Processor 202 typically also includes other logic elements (not shown) to retrieve and process instructions and to update its architectural state as instructions are retired. Bus controller 260 manages the flow of data between processor 202 and main memory 270. L2 cache 240 may be on a different chip than processor 202, in which case bus controller 260 may also manage the flow of data between L2 cache 240 and processor 202. The present invention does not depend on the detailed structure of the memory system or the processor.

L0 cache 220, L1 cache 230, L2 cache 240, and main memory 270 form a memory hierarchy that provides data and instructions to execution resources 210. The instructions operate on data (operands) that are provided from register files 214 or bypassed to execution resources 210 from various components of the memory hierarchy. A predicate register file 218 may be used to conditionally execute selected instructions in a program. Operand data is transferred to and from register file 214 through load and store operations, respectively. A load operation searches the memory hierarchy for data at a specified memory address, and returns the data to register file 214 from the first level of the hierarchy in which the requested data is found. A store writes data from a register in file 214 to one or more levels of the memory hierarchy.

For the present invention, portions of register files 214, 218 may be rotated by a register renaming unit 216. When execution resources 210 implement a loop in which prefetches are managed in accordance with the present invention, the prefetch operations are directed to different locations in a data region 274 of memory 270 by rotation of the registers. These prefetch operations move array data to one or more low level caches 220, 230, where they can be accessed quickly by load instructions in the loop when the corresponding loop iterations are reached. The instructions that implement prefetching, loading, and manipulating the data are typically stored in an instruction region 278 of memory 270 during execution. They may be supplied to main memory from a non-volatile memory structure (hard disk, floppy disk, CD, etc.).

Embodiments of the present invention are illustrated by specific code segments with the understanding that persons skilled in the art and having the benefit of this disclosures will recognize numerous variations of these code segments that fall within the spirit of the present invention.

One embodiment of the present invention is illustrated by the following code segment:

(II)
    r41=address of E(1+X)
    r42=address of D(1+X)
    r43=address of C(1+X)
    r44=address of B(1+X)
    r45=address of A(1+X)
(IIa) Loop:
  Prefetch [r45]
  r40=r45+INCR
  . . .
  load A(J)
  load B(J)
  load C(J)
  load D(J)
  load E(J)
  . . .
  J=J+1
  branch Loop A, B, C, D, and E represent arrays, the elements of which are accessed from within the loop portion of code segment (II) by the corresponding load instructions. When prefetching is synchronized properly, the data elements targeted by these loads are available in a low level cache, and can be supplied to the processor's execution resources with low access latency, e.g. a one or two cycles. In code segment (II), this is accomplished by selecting appropriate values for address offset, X, and address increment, INCR.

In the disclosed loop, when the current loop iteration is operating on element (J) of the arrays, the prefetch targets element (J+X) of the array. Here, X represents the number of array elements by which the targeted element follows the current element. In effect, X represents the lead time necessary to ensure sure that element J+X is in the cache when the load targeting J+X executes. The value of X depends on the number of cycles required to implement each iteration of code segment (II), and the latency for returning data from the main memory. For example, if code segment (II) completes an iteration in 10 clock cycles and it takes 100 clock cycles to return a cache line from memory, the prefetch in the current iteration of the loop should target an element that is at least 10 elements ahead of that in the current iteration of the loop.

For each iteration of code segment (II), the prefetch instruction targets an address specified in r45. Here, r45 is a virtual register identifier that points to a value in a physical register. The correspondence between the physical register and the virtual register identifier is provided by the register renaming algorithm, which in this case is register rotation. For code segment (II), r41–r45 are initialized to addresses of elements in arrays E–A, respectively. The values in these registers are rotated on each iteration of the loop, when the loop branch instruction is executed. Register rotation adjusts the array to which the prefetch instruction applies on each iteration of code segment (II). This eliminates the need for separate prefetch instructions for each array and the bandwidth problems associated with bunched prefetches. It also allows the frequency with which prefetches are issued for a particular array to be adjusted to reflect the size of the cache line returned by prefetches and the array stride.

The assignment instruction, r40=r45+INCR increments the target address of the array for its next prefetch and returns it to a starting register in the set of rotating registers. In code segment (II), the prefetch targets an element of a given array every 5 iterations—the number of loop iterations necessary to move the incremented array address from r40 back to r45. As a result, a prefetch targets elements in arrays A, B, C, D, and E on 5 successive iterations, then repeats the cycle, beginning with array A on the $6^{th}$ iteration.

The increment value in the assignment instruction depends on the following parameters: the size of the cache line returned on each prefetch (L); the number of iterations between line fetches, i.e. the number of arrays that require prefetches (N); and the size (stride) of the array elements (M). The cache line size divided by the stride is the number of iterations for which a single line fetch provides data. For example, where a cache line is 64 bytes (L=64), data is required for 5 arrays (N=5), and each array element is 8 bytes (M=8):

$$INCR=N*L/M$$

For the above example, INCR=5*64/8=40.

Certain ISAs, e.g. the IA-64 ISA, provide prefetch instructions that automatically increment the address to be prefetched by a specified value, e.g. prefetch [target address], address increment. For these ISAs, the prefetch and assignment instructions can be replaced by a an auto-increment prefetch instruction and a MOV instruction. For example, the first two instructions in loop (IIa) may be replaced by prefetch [r45], 40 and mov r40 =r45.

Table 1 shows the iterations of Loop (II) for which elements of array A are prefetched, the current element of A when the prefetch is launched, the address of the element to be prefetched, and the elements of the array returned by the prefetch. Table entries are suitable for the case in which X=20.

| J | CURRENT ELEMENT | PREFETCH ADDRESS | CACHE LINE CONTENTS |
|---|---|---|---|
| 0 | A(0) | A(20) | A(16)–A(23) |
| 5 | A(5) | A(25) | A(24)–A(31) |
| 10 | A(10) | A(30) | A(24)–A(31) |
| 15 | A(15) | A(35) | A(32)–A(39) |
| 20 | A(20) | A(40) | A(40)–A(47) |
| 25 | A(25) | A(45) | A(40)–A(47) |
| 30 | A(30) | A(50) | A(48)–A(55) |
| 35 | A(35) | A(55) | A(48)–A(55) |
| 40 | A(40) | A(60) | A(56)–A(63) |
| 45 | A(45) | A(65) | A(64)–A(71) |
| 50 | A(50) | A(70) | A(64)–A(71) |

The method embodied in code segment (II) does generate some redundant prefetches. For example, those launched on the $10^{th}$ $25^{th}$, $35^{th}$ and $50^{th}$ iterations target the same cache lines as the launched on the $5^{th}$, $20^{th}$, $30^{th}$ and $45^{th}$ iterations. Redundant prefetches are generated when the numbers of array elements returned in a cache line is incommensurate with the number of iterations between prefetches. The level of redundancy is, however, significantly less than that obtained when prefetches are launched on every iteration. In addition, the processor may include logic to identify and eliminate redundant prefetches.

Another embodiment of the present invention is illustrated by the following code segment:

(III)
```
    p41=true
    p42=false
    p43=false
    p44=false
    p45=false
    p46=false
    p47=false
    p48=false
    r4=address of A(1+X)
    r5=address of B(1+X)
    r6=address of C(1+X)
    r7=address of D(1+X)
    r8=address of E(1+X)
```
(IIa)
```
  Loop:
    (p41) prefetch [r4], 64
    (p42) prefetch [r5], 64
    (p43) prefetch [r6], 64
    (p44) prefetch [r7], 64
    (p45) prefetch [r8], 64
    p40=p48
    load A(J)
    load B(J)
    load C(J)
    load D(J)
    load E(J)
    . . .
    J=J+1
    branch Loop
```

Prior to entering the loop (IIIa), a set of rotating predicate registers, p41–p48 are initialized so that at least one predicate represents a logic true value. In addition, each register in a set of non-rotating registers, r4–r8, is initialized to a prefetch address for one of the arrays, A–E. Here, X represents an offset from the first address of the array. As in the previous embodiment, it is selected to provide enough time for prefetched data to be returned to a cache before the load targeting it is executed.

The loop (IIIa) includes a predicated prefetch instruction for each array. The true predicate value moves to successive predicate registers as the predicate registers rotate on successive loop iterations. On each iteration, the prefetch instruction gated by the predicate register that currently holds the true value is activated. The other prefetch instructions are deactivated (predicated off). Of the 8 predicate registers in the set, only 5 gate prefetch instructions. The last three are dummies that allow the prefetch frequency for an array to be synchronized with the cache line size and the array stride. For the disclosed embodiment, a prefetch is activated once every eight iterations by rotating the true predicate value through a set of 8 rotating predicate registers. This makes the number of iterations between prefetches (8) equal to the number of array elements returned by a cache line (8), eliminating redundant prefetches.

For the disclosed embodiment, the activated prefetch instruction automatically increments the address in the corresponding register by 64 bytes, e.g. 8 array elements. For other embodiments, the same operations may be accomplished by a simple prefetch instruction (one without an auto-increment capability), and an assignment instruction (r4=r4+64) as in code segment (II).

Following the predicated prefetches, the assignment instruction, p40=p48 rotates the value in the last predicate register of the set back to a position from which it can begin to cycle through the set of predicate registers again. An embodiment of code segment (III) based on the IA-64 ISA may implement the assignment using the following compare instruction:

(p48) comp.eq.unc p40, p0=r0,r0.

The IA-64 ISA also allows the predicate initialization to be implemented by a single instruction, pr.rot=0× 20000000000, which initializes P41 to true and all other predicate registers to false.

Figure 3:
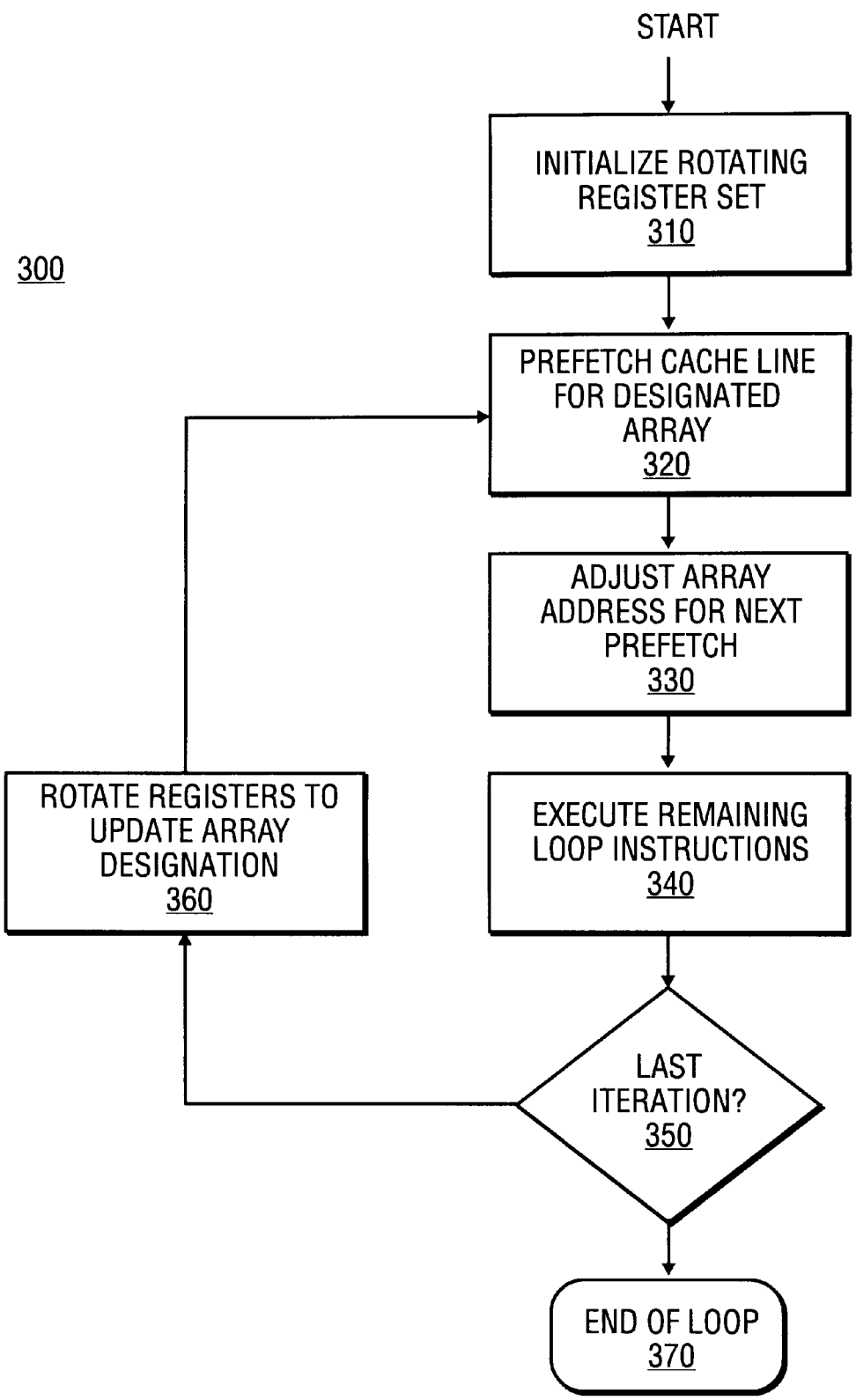
FIG. 3 is a flowchart representing a method in accordance with the present invention for processing prefetches from within a loop.

FIG. 3 is a flowchart representing a method 300 in accordance with the present invention for executing software prefetches from within a loop. Before entering the loop portion of method 300, a set of rotating registers is initialized 310. For example, rotating general registers may be initialized with the first prefetch addresses of the arrays, as illustrated by code segment (II). Alternatively, rotating predicate registers may be initialized to logical true or false values, to activate selected prefetch instructions, as illustrated in code segment (III). In this case, non-rotating general registers are initialized to the first prefetch addresses of arrays.

Following initialization 310, the loop portion of method 300 begins. A cache line is prefetched 320 for an array designated through the rotating register set. For disclosed embodiments, this is accomplished through prefetch instruction(s) that are parameterized by one or more of the rotating registers. For code segment (II), the target address is the parameter and the general register specifying the target address parameterizes the prefetch. For code segment (III), the predicates associated with the prefetch instructions are the parameters, and the predicate registers that hold these values parameterize their associated prefetches. In each case, altering the value in the designated register changes the array targeted by the prefetch operation. Following the prefetch 320, the address of the array(s) for which the prefetch is performed is adjusted 330 to point to the cache line containing the next element to be prefetched for the array(s).

Any instructions in the loop body, such as the load instructions and any instructions that operate on loaded values, are executed 340 on each iteration of the loop. While these are shown to follow prefetching 320 and adjusting 330 in FIG. 3, their relative order in method 300 is not important. The remaining instructions may be executed before, after, or concurrently with prefetching and adjusting the current array address. On each loop iteration, a termination condition 350 is checked and the loop is terminated 370 if the condition is met. If additional iterations remain, registers are rotated 360 to update the prefetch instruction for the next iteration, and the loop is repeated. Depending on the computer system employed, registers may be rotated even when the loop termination condition is met.

The present invention thus supports efficient prefetching from within a loop, by reducing redundant prefetches and distributing prefetch activity across multiple loop iterations. This is accomplished without expanding the code size of the loop or increasing the instruction overhead. A set of rotating registers is initialized, and one or more prefetch instructions within the loop are parameterized by one or more rotating registers. Operation of the prefetch instruction(s), e.g. the target address, active/NOP status, is adjusted as the registers are rotated on successive iterations of the loop. The present invention may be employed advantageously in any code that implements prefetching from within a loop.

The disclosed embodiments have been provided to illustrate the general features of the present invention. Persons skilled in the art of computer software, having the benefit of this disclosure, will recognize modifications and variations of these embodiments that fall within the spirit of the present invention. The scope of the invention is limited only by the appended claims.

What is claimed is:

1. A method for prefetching data comprising:
    initializing a rotating register to indicate a prefetch operation to a first array;
    initiating the prefetch operation to the first array;
    loading data for one or more arrays, including the first array; and
    executing a register rotation to indicate a prefetch operation to a new array.

2. The method of claim 1, wherein the rotating register stores an array address and initializing the rotating register comprises initializing the rotating register to an address of the first array.

3. The method of claim 2, wherein executing a register rotation comprises:
    incrementing the address in the rotating register to point to a new element of the first array; and
    rotating an address associated with a new array into the rotating register.

4. The method of claim 1, wherein the rotating register is a designated register of a set of rotating registers, and initializing the rotating register comprises initializing the designated register to point to the first array and initializing other rotating registers of the set to point to corresponding other arrays.

5. The method of claim 1, wherein initializing a rotating register to indicate a prefetch operation to a first array comprises initializing the rotating register to activate a prefetch operation that targets the first array.

6. The method of claim 5, wherein the rotating register is a predicate register and the prefetch operation is activated by writing a specified logic value to the predicate register.

7. The method of claim 6, wherein executing a register rotation comprises rotating the specified logic value into a predicate register that activates a prefetch operation to the new array.

8. A method for prefetching elements from a plurality of arrays, the method comprising:
    issuing a prefetch for an element of an array that is specified through a prefetch parameter;
    loading data from each of the plurality of arrays; and
    adjusting the prefetch parameter, responsive to a loop branch.

9. The method of claim 8, wherein the prefetch parameter is stored in a rotating predicate register that gates a prefetch associated with the array, and issuing the prefetch comprises issuing the prefetch when the predicate register holds a specified logic value.

10. The method of claim 9, wherein adjusting the prefetch parameter comprises moving a new logic value into the predicate register by register rotation.

11. The method of claim 8, wherein the prefetch parameter is an array address stored in a designated rotating register, and issuing the prefetch comprises issuing the prefetch to an element of the array indicated by the address.

12. The method of claim 11, wherein adjusting the prefetch parameter comprises rotating an address associated with another array into the designated rotating register.

13. A method for prefetching data comprising:
    issuing a prefetch that is parameterized by a rotating register;
    adjusting an address targeted by the prefetch; and
    rotating a new value into the rotating register to indicate a next prefetch.

14. The method of claim 13, wherein issuing a prefetch that is parameterized by a rotating register comprises issuing a prefetch having a target address specified by a value in the rotating register.

15. The method of claim 14, wherein rotating a new value into the rotating register comprises rotating a new target address into the rotating register.

16. The method of claim 13, wherein the rotating register is a rotating predicate register and issuing a prefetch comprises issuing a prefetch that is gated by a predicate stored in the rotating predicate register.

17. The method of claim 16, further comprising initializing a set of rotating predicate registers with logic values at least one of which represents a logic true value.

18. The method of claim 17, wherein rotating a new value into the rotating register comprises rotating the logic values among the set of rotating predicate registers.

19. The method of claim 17, wherein the number of predicate registers initialized is determined by a frequency with which the issued prefetch is to be gated on by the predicate register.

20. The method of claim 13, wherein the rotating register is a predicate register that activates the prefetch if a stored predicate value is true and nullifies the prefetch if the stored predicate value is false.

21. The method of claim 13, wherein the rotating register specifies a target address of one of a plurality of arrays and rotating a new value into the rotating register comprises rotating a target address for one of the arrays into the rotating register.

22. A machine readable medium on which are stored instruction that may be executed by a processor to implement a method comprising:
    issuing a prefetch operation that is parameterized by a rotating register;
    adjusting an address targeted by the prefetch operation; and
    rotating a new value into the rotating register to indicate a next prefetch operation.

23. The machine-readable medium of claim 22, wherein issuing a prefetch operation that is parameterized by a rotating register comprises issuing a prefetch operation having a target address specified by the rotating register.

24. The machine-readable medium of claim 22, wherein the rotating register is a predicate register and issuing a prefetch operation comprises issuing a prefetch operation that is gated by a predicate stored in the predicate register.

25. A computer system comprising:
a processor to execute instructions; and
a memory on which are stored instructions that may be executed by the processor to implement a method comprising:
issuing a prefetch operation that is parameterized by a rotating register;
adjusting an address targeted by the prefetch operation; and
rotating a new value into the rotating register to indicate a new prefetch operation.

26. The computer system of claim 25, wherein issuing a prefetch operation that is parameterized by a rotating register comprises issuing a prefetch operation having a target address specified by the rotating register.

27. The computer system of claim 25, wherein the rotation register is a predicate register and issuing a prefetch operation comprises issuing a prefetch operation that is gated by a predicate stored in the predicate register.

28. A computer system comprising:
a processor having a set of rotating registers; and
a memory to store a program including instructions that are executable by the processor to:
initialize a first of the rotating registers to indicate a prefetch operation to a selected array;
execute a prefetch to the selected array; and
rotate values among the rotating registers to indicate a prefetch operation to a new selected array.

29. The system of claim 28, wherein the rotating registers are general rotating registers that are initialized with values that point to a set of arrays, the set of arrays including the selected array and the new selected array.

30. The system of claim 29, further comprising an instruction that is executable by the processor to increment the value in the first of the rotating registers.

31. The system of claim 28, wherein the rotating registers are a set of predicate registers that are initialized to values representing logical true or logical false states.

32. The system of claim 31, further comprising a set of prefetch operations to fetch data from a corresponding set of arrays, each of the prefetch operations being gated by a corresponding one of the predicate registers.

33. The system of claim 28, wherein the instruction to rotate values among the rotating registers includes a loop branch instruction.

34. The system of claim 33, wherein the processor executes a prefetch to the new selected array after it executes the loop branch instruction.

35. The system of claim 34, wherein the instructions cause the processor to repeat the execute and rotate operations until a loop termination condition is detected.

* * * * *

UNITED STATES PATENT AND TRADEMARK OFFICE
CERTIFICATE OF CORRECTION

PATENT NO. : 6,321,330 B1
DATED : November 20, 2001
INVENTOR(S) : Doshi et al.

It is certified that error appears in the above-identified patent and that said Letters Patent is hereby corrected as shown below:

<u>Column 4,</u>
Line 47, delete "hat", insert -- that --.

<u>Column 7,</u>
Line 20, delete "numbers", insert -- number --.

Signed and Sealed this

Eighteenth Day of June, 2002

*Attest:*

JAMES E. ROGAN
*Attesting Officer*    *Director of the United States Patent and Trademark Office*